July 2, 1968 D. F. WILLS 3,390,612
DUAL STROKE ACTUATOR
Filed July 6, 1965 2 Sheets-Sheet 2

INVENTOR
DONALD F. WILLS
BY Radford W. Luther
ATTORNEY

United States Patent Office 3,390,612
Patented July 2, 1968

---

3,390,612
DUAL STROKE ACTUATOR
Donald F. Willis, Suffield, Conn., assignor to Chandler Evans Inc., West Hartford, Conn., a corporation of Delaware
Filed July 6, 1965, Ser. No. 469,512
8 Claims. (Cl. 91—189)

ABSTRACT OF THE DISCLOSURE

A pneumatically operated power actuator having two pistons coaxially positioned within the actuator housing such that one piston is held against a shoulder of the housing by pneumatic pressure while the other piston moves axially a limited distance back and forth in the housing. A follow-up valve is positioned partially in each of the two pistons to control the movement of the one piston held against the shoulder such that the two pistons move in unison for the balance of the actuator stroke in one direction.

---

This invention relates to actuators and more particularly to an improved dual stroke actuator operated by a compressible fluid and used for actuating the control surfaces of high speed aircraft and the like.

The control surfaces of high speed aircraft and missiles are moved by power amplifying actuating devices that convert a low level power signal received from the missile control system into large power signal sufficient to directly move the missile control surfaces when these control surfaces are subjected to great aerodynamic pressure. One form of compressible fluid operated actuator system utilizes a gas, such as nitrogen, under high pressure, as the high level energy source to provide the power amplification necessary to operate the actuator. The gas is compressed under high pressure in a storage bottle and is released through an appropriate pressure reducing and regulating device into the actuator through an appropriate control and distribution device in response to the appropriate control signal. The control signal as a second function usually activates the initial release of the high pressure gas from the storage bottle at the instant of missile launch. The storage bottle provides a finite quantity of available energy for actuator power amplification. Therefore, to increase the effective operating life of a given control system without instituting dimensional or functional changes to the parameters of the gas storage bottle, an actuator must be provided that produces the same force level and stroke as a conventional actuator, but while accomplishing this result uses a smaller quantity of the pressurized compressible fluid contained in the storage bottle per unit of time of operation.

An object of this invention is to provide an actuator that consumes a smaller quantity of compressible pressurized fluid per unit of time of operation for the major portion of the flight regime of the vehicle while producing the same level of force output and same maximum length of stroke capability as comparable conventional compressible fluid operated actuators.

A further object of this invention is to provide a compressible fluid operated actuator that has a higher natural frequency and an increased frequency response, under most operating conditions for the major portion of the vehicle flight regime, in comparison to the conventional compressible fluid operated actuator, while simultaneously providing the same maximum force output and maximum stroke capabilities as conventional compressible fluid operated actuators.

Further objects of my invention are to devise a compressible fluid operated actuator that embodies the following novel features:

(a) Use of a dual piston arrangement for the axially movable elements of the actuator whereby one of said pistons is a force output piston that operates within a narrow displacement band either side of a center or midstroke position during the major portion of the vehicle flight regime and moves in unison in one direction with the second piston to provide the maximum stroke capability that may be necessary for satisfactory control operation for a small portion of the flight regime.

(b) Use of two co-axially disposed pistons in a compressible fluid operated actuator such that one of said pistons, designated the output piston, moves to and fro about the mid-stroke position a small portion of the total available displacement for the major portion of the vehicle flight regime, thereby providing the vehicle control surface actuator operated system with a higher frequency response than the conventional actuator.

Other objects and advantages of the invention will appear in the following description of the respective preferred embodiment thereof shown in the attached drawings in which:

FIGURE 1 is an axial sectional view, partly diagrammatic, illustrating one embodiment of the present invention as applied to the actuation of a control surface of a missile.

FIGURE 2, included for purposes of comparison, is an axial sectional view of a conventional equal area piston double acting actuator with accompanying control surface and interconnecting mechanical linkage.

FIGURE 3, included for comparison purposes, is a sectional view, similar to FIGURE 2, of a conventional half area piston double acting actuator with accompanying control surface and interconnecting mechanical linkage.

Figure 2:
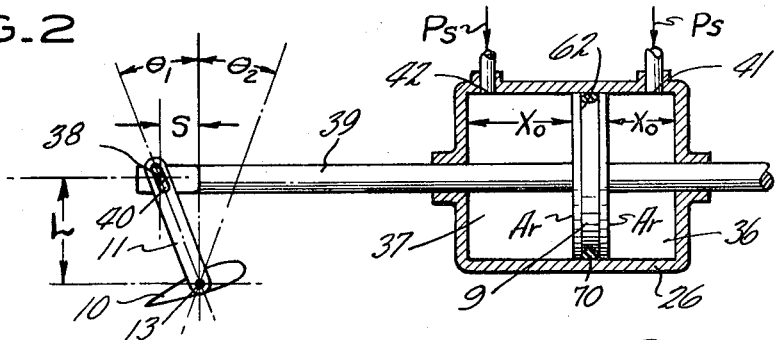

Referring now to the drawings, wherein like characters are used throughout to designate like elements and more specifically to FIGURE 2, wherein is shown a typical conventional equal area piston bidirectional actuator containing an output piston 9 surrounded by a fluid tight housing 26. The basic operation of this equal area actuator requires the alternate admittance of pressurized fluid $P_s$ into pressurizing chambers 36 and 37. Chamber 36 is defined by housing 26 and one radially disposed face of output piston 9. Chamber 37 is defined by housing 26 and the face of output piston 9 opposite that face defining chamber 36. An O ring seal 70 contained in a circumferential groove 62 is output piston 9 provides an axially movable fluid tight sealing arrangement between chambers 36 and 37. Output piston 9 is connected to aerodynamic control surface 10 through bell crank 11, journal pin 38 and connecting rod 39 such that bidirectional axial movement of piston 9 produces corresponding bidirectional rotary movement of aerodynamic control surface 10. Connecting rod 39 is rigidly fixedly secured to piston 9, and journal pin 38 is fixedly secured to connecting rod 39. Bell crank 11 and aerodynamic control surface 10 are fixedly secured to control shaft 13. Bell crank 11 is provided with an elongated slot 40 so that the axial movement of journal pin 38 can be translated into rotary movement at ball crank 11 and simultaneously compensate for the variation of the length of the bell crank arm as it moves through its total arc, designated in FIGURE 2 as $2\theta$. In an equal area piston actuator, by definition, the area of the opposing sides of the output piston 9 are equal. In FIGURE 2 the opposite equal areas of the output piston 9 are designated by the symbol $A_r$, as shown.

Axial motion of journal pin 38 is produced by introducing pressurized fluid $P_s$ through port 41 into pressurizing chamber 36 while simultaneously exhausting pressurizing chamber 37 through connecting port 42. The differential pressure of pressurized fluid $P_s$ and exhaust chamber pressure acts on area $A_r$ to produce a resulting force that will move actuator piston 9 and its fixedly secured connecting rod 39 and journal pin 38 to the left, and produce a corresponding counterclockwise rotation of control surface 10. Similarly, if pressurized fluid is introduced into pressurizing chamber 37 through port 42 while pressurizing chamber 36 is exhausted through port 41, the differential pressure of pressurized fluid $P_s$ acting on area $A_r$ will produce a resulting force that will move actuator piston 9 and its fixedly secured connecting rod 39 and journal pin 38 to the right with corresponding clockwise rotation of control surface 10; thus producing a bidirectional axial movement capability for equal area output piston 9 and its fixedly connected elements connecting rod 39 and journal pin 38. The bidirectional axial movement of journal pin 38 is transformed into a bidirectional rotary movement of aerodynamic control surface 10 by means of bell crank 11 and control shaft 13. The magnitude of the rotary movement of control surface 10 is trigonometrically related to the length L of bell crank arm 11 and the maximum length of the stroke of output piston 9. In FIGURE 2 output piston 9 is shown in its mid-stroke position. By definition, the mid-stroke position is that position half-way between the extreme left hand and right hand positions of actuator piston 9. Thus, the mid-stroke distance, designated as $X_0$ in FIGURE 2, is, by definition, equal in both directions. Similarly, the arcuate travel of bell crank 11 in both a clockwise and a counterclockwise direction from the mid-stroke position, designated as $\theta$ in FIGURE 2, is equal. Thus, by definition, the mid-stroke position of bell crank 11 is that position where $\theta_1 = \theta_2$.

The principal function of an actuator, such as that shown in FIGURE 2, is to produce a force that can be converted into an output torque capable of controlling the movement of aerodynamic control surface 10 throughout the course of the vehicle flight operations. In the design of control systems utilizing an actuator, such as shown in FIGURE 2, the actuator system is so constructed that it will produce an output torque with a magnitude at least equal to the stall torque of the control surface to be operated.

The actuator shown in FIGURE 2 produces a force output that is the product of the pressure differential $P_d$ across the face of the actuator piston 9 and the actuator piston area $A_r$:

$$F = P_d \cdot A_r \qquad (1)$$

The torque produced by the actuator control system shown in FIGURE 2 is the product of the force output of the actuator F, and the bell crank arm L, or:

$$T_s = F \cdot L \qquad (2)$$

The magnitude of the torque produced as the product of the maximum differential pressure of the output piston 9 and the bell crank 11 mid-stroke arm length, shown mathematically by Equation 2, must be at least equal in magnitude and opposite in direction to the maximum torque produced by the maximum dynamic pressure present on the aerodynamic control surface 10 acting through the center of pressure of said control surface. This value of torque is designated the stall torque and represents the design condition utilized when sizing actuators to operate aerodynamic control surfaces.

To establish the quantity of pressurized fluid required for the total assigned operational lift of a give actuator system, the actuator stroke and the assigned total time of operation are utilized; the quantity of fluid required is established in accordance with equation:

$$Q_t = A_r \cdot X \cdot t \qquad (3)$$

When the volume of pressurized fluid required for a given total working axial movement designated as X and equal to the sum of the movement either side of the mid-stroke position of the actuator piston 9, has been established in accordance with Equation 3, the weight of fluid required for a specific total time of operation T is known from the following equation;

$$W_t = Q_t \rho \qquad (4)$$

In Equations 1–4 above:

F = Force in pounds
$P_d$ = Pressure differential in pounds per square inch
$A_r$ = Piston area in square inches
$T_s$ = Torque in inch pounds
L = Torque arm length in inches
$Q_t$ = Volume in cubic inches for operation time $t$
X = Axial distance of piston movement in inches
$\rho$ = Density of pressurized fluid in pounds per cubic inch
$t$ = Total time of operation in seconds
$W_t$ = Weight of gas required for total time of operation $t$ Utilizing the stall torque conditions of a given actuator systems per Equation 2 above, in conjunction with the axial motion history of the output piston 9 and the total time of actuator operation, it is possible to establish the total quantity of pressurized fluid required for the operation of the actuator system in accordance with Equation 4 above. A knowledge of the total quantity of fluid required becomes particularly important when the actuator system involves a limited finite source of pressurized fluid such as a pressurized bottle supply.

Figure 3:
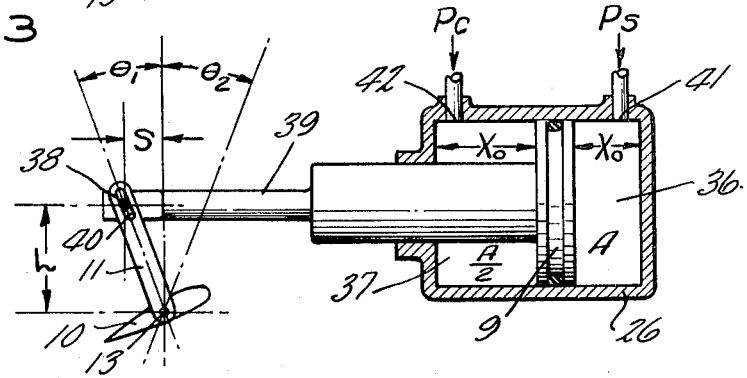

FIGURE 3 shows a typical conventional half area actuator system wherein an output piston 9 is contained in a housing 26. This piston actuator structure is similar to that shown in FIGURE 2 with the exception that the area of one face of the actuator piston is twice that of the other face. Thus, as shown in FIGURE 3, the area A adjacent pressurized chamber 36 is twice the area of the piston face adjacent pressurized chamber 37. In operation, the pressurized chamber 37 of the half area actuator is constantly subjected to maximum available regulated pressure designated as $P_c$. Pressurized chamber 36 is subjected to pressurized fluid $P_s$ admitted through port 41 that varies in magnitude from 0 to maximum available regulated pressure $P_c$. In FIGURE 3, to provide bidirectional rotational movement of the aerodynamic control surface, compressible fluid under maximum regulated pressure $P_c$ is supplied to pressurizing chamber 37, while compressible fluid $P_s$ varying in pressure from 0 to $P_c$ is supplied as required to pressurized chamber 36.

The area of piston 9 subjected to constant regulated maximum supply $P_c$ is one-half the area of the opposite side of said output piston. Thus, when a pressure of magnitude exactly .5 $P_c$ is impressed upon the larger area A of output piston 9, a null condition exists. A pressure less than .5 $P_c$ results in a pressure differential $P_d$ such that axial motion of output piston 9 to the right results, while a pressure greater than .5 $P_c$ produces a pressure differential $P_d$ such that axial motion of output piston 9 to the left results.

For a given actuator system, the maximum design torque, called the stall torque, and mathematically described in Equation 2, is a parameter usually specified at the outset of a given design problem. It is to be noted that for a given value of stall torque, the relationship between the full area actuator, shown in FIGURE 2, and the half area actuator, shown in FIGURE 3, is such that with equal torque arm lengths the product of the maximum magnitude of the supply pressure $P_c$ and maximum value of the output piston area must be equal for both actuators to produce the same value of stall torque. Thus, for actuators wherein the magnitude of the piston stroke from the mid-stroke, or null position, as shown in FIGURES 2 and 3, is equal, the quantity of pressurized fluid required, for equal output piston displacement histories and equal periods of time of operation at equal values of stall torque, for the full area and half area actuators is the same.

Figure 4:
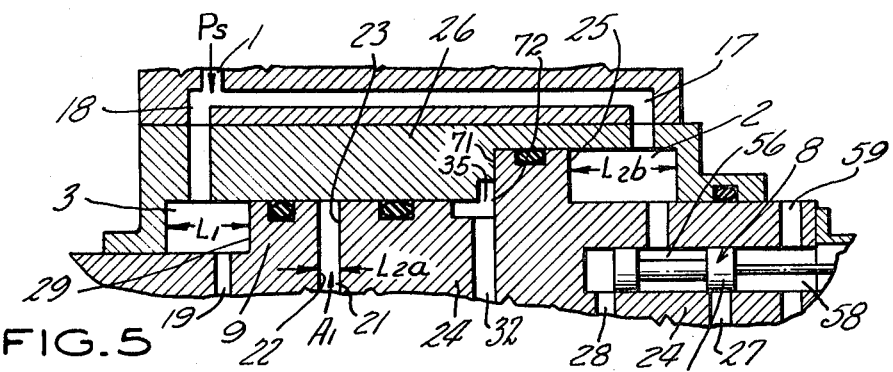
FIGURE 4 is a fragmentary axial sectional view of the dual piston portion of the preferred embodiment of the present invention drawn to an enlarged scale to more clearly illustrate the motions of the dual pistons.

FIGURE 4 shows a representative embodiment of the present invention wherein output piston 9 serves the same function as the similar output pistons, designated by the same reference numeral 9 in FIGURES 2 and 3. A follow-up piston 24 is co-axially positioned with output piston 9 in housing 26. Pressurized fluid $P_s$ is admitted through conduit 1 and connecting conduit 18 into pressurizing chamber 3 such that maximum regulated compressive fluid pressure $P_c$ is impressed on area 29 of piston 9. Similarly, regulated pressurized fluid $P_s$ is conducted into conduit 1 through connecting conduit 17, and thence into chamber 2 such that full regulated fluid pressure $P_c$ is impressed on area 25 of follow-up piston 24. A variable compressive fluid pressure $P_{sv}$ is communicated to chamber 21 by appropriate control means that will be more fully described later in the description of operation. The pressure $P_{sv}$ varies from 0 to $P_c$ and is impressed on area 22 of output piston 9. The area 22 of piston 9, designated $A_1$, is twice the area 29 of piston 9. The variable pressure in chamber 21 produces an axial movement of actuator piston 9 similar to that described for the half area actuator of FIGURE 3. The mid-stroke, or null, position of the dual stroke actuator is shown in FIGURE 4. The mid-stroke, or null, position of the dual stroke actuator is shown in FIGURE 4. The mid-stroke position, as shown in FIGURE 4, is represented by the following equation;

$$L_1 = L_{2a} + L_{2b}$$

The operation of the dual stroke actuator, shown in FIGURE 4, is such that for movement of actuator piston 9 from the mid-stroke position to the full half stroke position to the left $L_1$, the follow-up piston 24 remains stationary in fixed relationship to housing 26, with surface 72 of follow-up piston 24 in contact with surface 71 of housing 26. However, when the axial movement of actuator piston 9 is to the right, once actuator piston 9 has traversed a preselected distance from the mid-stroke position, designated $L_{2a}$ in FIGURE 4, a follow-up system, or second control system, to be described in greater detail later, will cause follow-up piston 24 to move to the right in concert with actuator piston 9.

The novel organization of the elements of the dual stroke actuator, shown in FIGURE 4, makes it possible to obtain the full actuator piston stroke available in the conventional actuators, shown in FIGURES 2 and 3, while providing the same magnitude of stall torque as the conventional actuators while utilizing a reduced quantity of compressible fluid for most of a typical missile's normal flight regime.

FIGURE 3 shows a conventional half area actuator with the piston disposed in the central position in relation to the total available stroke. The half stroke distance is designated as $X_0$. The larger area of the actuator piston is designated by the letter A.

The novel dual stroke actuator of the present invention is shown in FIGURE 4 in the mid-stroke position, similar to that shown in FIGURE 3 for the conventional actuator. In FIGURE 4, movement of the actuator piston 9 to the left to the full half stroke position is designated by the symbol $L_1$. Full half stroke movement to the right is the sum or combination of the distances $L_{2a}$ and $L_{2b}$, as shown in FIGURE 4. The mid-stroke, by definition, is represented by the following equation:

$$L_1 = L_{2a} + L_{2b}$$

For the purpose of illustrating the reduced consumption of pressurized fluid of the dual stroke actuator, an analysis will be presented wherein all relevant operating conditions and dimensions of the conventional actuator, shown in FIGURE 3, and the dual stroke actuator, shown in FIGURE 4, are equal. Thus, for purposes of this analysis, assume:

$$X_0 = L_1 = L_{2a} + L_{2b}$$

Assume the larger area of piston 9, in FIGURE 4, designated as $A_1$, is equal to A in FIGURE 3; thus:

$$A_1 = A$$

Further, for the purposes of this analysis, the linear distance $L_{2a}$ will be considered to be one-fifth of the distance $X_0$. It is to be noted $L_{2a}$ can be any fraction of $X_0$ from 0 to 1.0; however, the $.2X_0$ value selected for this example is representative of typical operational actuators. Thus:

$$L_{2a} = .2X_0 \tag{5}$$

If the output piston 9 in FIGURE 3 is moved from the mid-stroke position fully to the left, the total volume that must be filled with a compressible operating fluid is $AX_0 + AX_0$. This total volume is equal to $2AX_0$ and will be designated by the symbol $V_f$. Thus:

$$2AX_0 = V_f \tag{6}$$

From thermodynamics, the perfect gas law is expressed in equation form as follows:

$$W = PV/RT \tag{7}$$

Equation 7 rearranged can be expressed as follows:

$$W = V \times P/RT \tag{8}$$

The volume V can be expressed as $V_f$. Thus, by substitution, it can be seen that Equation 8 can be written:

$$W = 2AX_0 \times P/RT \tag{9}$$

Similarly, if the actuator piston 9 of the dual stroke system, as shown in FIGURE 4, is moved full stroke to the left from the mid-stroke position, the total volume that initially must be filled with compressible pressurized fluid is $AL_1 + AL_{2a}$.

Since $L_1 = X_0$ and from Equation 6 $L_{2a} = .2X_0$, by substitution the total volume $V_d$ of the dual actuator or FIGURE 4 that must be filled can be expressed as:

$$V_d = A \times X_0 + A \times .2X_0 \tag{10}$$

Equation 10 by addition is equal to:

$$V_d = A \times 1.2X_0 \tag{11}$$

Thus, it can be seen by a comparison of Equations 6 and 11 that for equal full half stroke travel of the dual stroke actuator, shown in FIGURE 4, and the conventional half area actuator, shown in FIGURE 3, the dual stroke actuator requires less volume to be filled by the ratio of 2:1.2.

It can be seen from FIGURE 3 that with the output piston 9 in the mid-stroke position, the volume 36 circumscribed by housing 26 and the large area A of output piston 9 of the conventional actuator can be expressed as $AX_0$. Similarly, this same volume for the dual stroke actuator, shown in FIGURE 4, can be expressed as $.2AX_0$. These initial or starting volumes for both dual stroke and conventional half area actuators will be designated as $V_0$.

Thus, by substitution for the conventional system:

$$V_0 = AX_0 \tag{12}$$

and for the dual stroke actuator:

$$V_0 = .2AX_0 \tag{13}$$

The reduced quantity of compressible fluids required for operation of novel dual stroke actuator, shown in FIGURE 4, in comparison to the conventional half area actuator, can be expressed with the aid of the perfect gas law. It is to be noted the perfect gas law is applicable to compressible fluids; thus this analysis applies only to actuators operated by compressible fluids and is not applicable to non-compressible (i.e., hydraulic) systems. Equation 7 expresses the perfect gas law as follows:

$$W = PV/RT \tag{7}$$

where:

W = weight of gas—lbs.
P = pressure—p.s.i.a.
V = volume—in.$^3$
T = gas temperature—° R.
R = gas constant—in./° R.

By rearranging the terms, Equation 7 can be expressed as Equation 8 as follows:

$$W = \frac{P}{RT}(V) \tag{8}$$

It can be seen that where P, R, and T are equal for both the novel dual stroke and the conventional half area piston system, the weight of the gas required by both systems can be expressed as the product of a constant $P/RT$ and the volume V to be filled.

By substitution of Equation 12 into Equation 8, the weight of gas consumed in the conventional system for a complete half stroke $X_o$ can be expressed as follows:

$$W = \frac{P}{RT}(2AX_o) \tag{14}$$

Similarly, by substitution of Equation 13 into Equation 8, the gas consumption of the dual stroke system for a complete half stroke $X_o$ can b expressed as follows:

$$W = \frac{P}{RT} \times (1.2AX_o) \tag{15}$$

Equations 14 and 15 show these appropriate expressions representing the volume of compressible fluid required for movement of output piston 9 full half stroke $X_o$ from the centered position. Thus, it can be seen by a comparison of Equations 14 and 15 that the ratio of the weight of compressible pressurized fluid required for full half stroke actuation for the conventional actuator in comparison to the duel stroke actuator is 2:1.2.

The dual stroke actuator is effective in reducing the weight of compressible fluid required in comparison to a comparable half area actuator primarily because most of the system control operation during the entire flight regime varies only a small axial distance from the mid-stroke position shown in FIGURE 4.

The effect small stroke operation for a long duration of time has on the ability of the dual stroke actuator to reduce gas consumption can best be shown by taking the first derivative of the perfect gas law expression 8 with temperature T held constant as follows:

$$W = \frac{PV}{RT} \text{ (Equation 8)}$$

$$W = \frac{1}{RT}PV$$

$$\Delta W = \Delta \left[\frac{1}{RT}PV\right]$$

$$\Delta W = \frac{1}{RT}[P_o \Delta V + V_o \Delta P] \tag{16}$$

where:

$\Delta W$ = mass rate of flow
$P_o$ = null condition pressure $[P_{sm}/2]$
$\Delta V$ = incremental volume change resulting from incremental pressure change—$\Delta P$
$V_o$ = initial volume at start of incremental movement
$\Delta P$ = incremental pressure change to compensate for load change From an analysis of Equation 16, it can readily be seen that for each incremental change in pressure ($\Delta P$) required to compensate for a change in actuator load conditions, the initial volume $V_o$ of compressible fluid subject to compressive change by the new pressure $P_o + \Delta P$ is less for dual stroke system than for the conventional actuator system by the ratio of 1:.2 when the stroke travel of the dual stroke actuator system is less than $.2X_o$. It is to be noted that in the above analysis a limitation was placed on the stroke travel to a magnitude of $.2X_o$. This travel of $.2X_o$ represents the small actuator movement prevelant during a large portion of the total flight regime. Since the characteristics of the control systems utilizing this novel dual stroke actuator are such that approximately 90% of the control operation will be confined to a maximum output piston 9 stroke less than $.2X_o$, it can be seen the above novel dual actuator permits a substantial decrease in the volume of compressible pressurized fluid that will be consumed. It is precisely this limited stroke operating characteristic control system that renders the novel dual stroke actuator organization of this invention effective to substantially reduce the weight of compressible fluid necessary for control actuation in comparison to that required of the conventional actuator shown in FIGURE 3.

Figure 1:
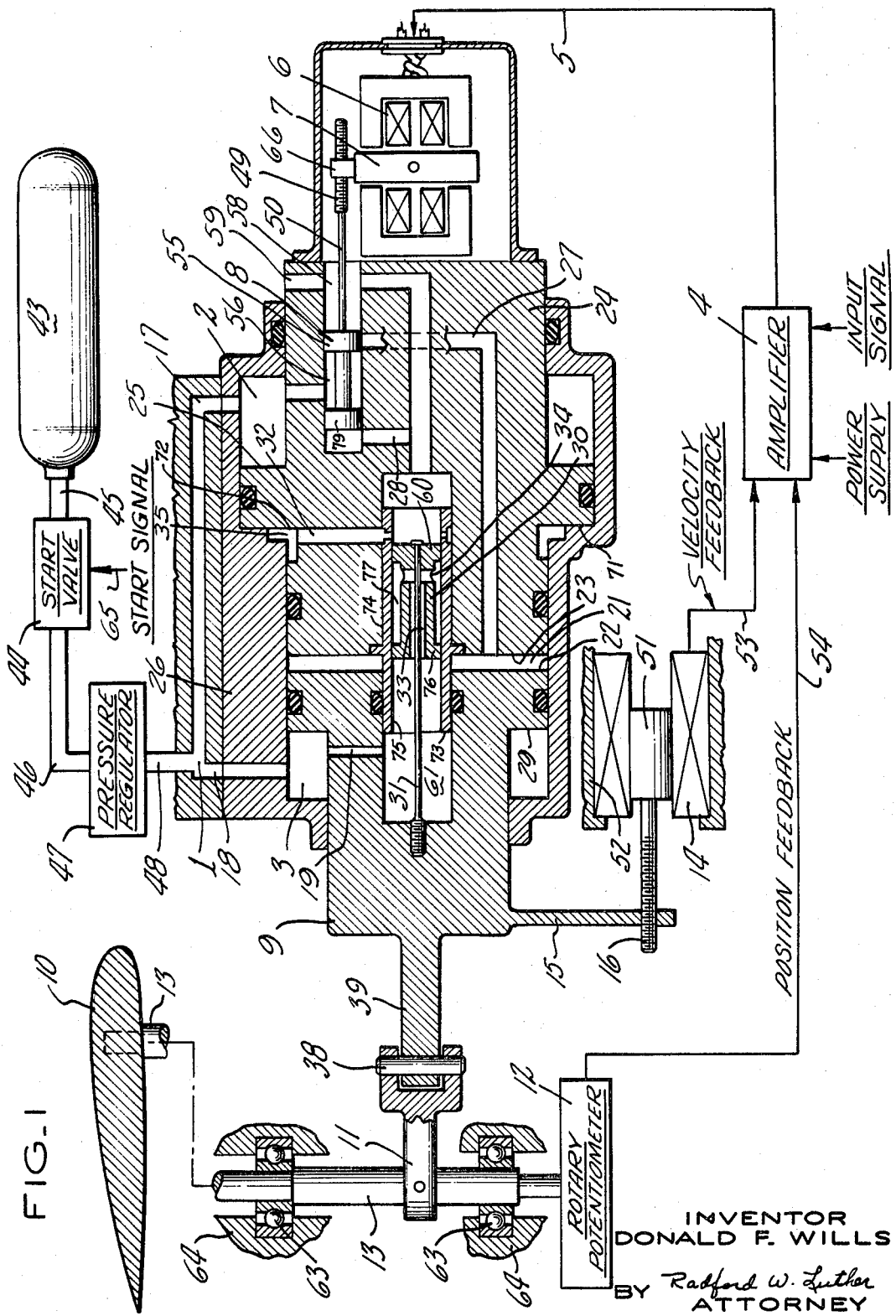

Stable operation is a further problem encountered in the operation of a compressible fluid operated control system actuator, such as shown in FIGURE 1. Applicant's dual stroke actuator structure enhances the stability of the control system by increasing the natural frequency of the actuator, as well as the frequency response of the control system. The ability of the dual stroke actuator control system to increase the fequency response can best be shown by analysis of the natural frequency equation. The natural frequency equation is expressed as follows:

$$W_n = \sqrt{\frac{\gamma \times P_s \times A^2 \times g}{2V_o M}} \tag{17}$$

where:

$W_n$ = natural frequency—rad./sec.
$\gamma$ = specific heat ratio of gas
$P_s$ = gas supply pressure—#/in.$^2$ absolute
$A$ = large piston area—in.$^2$
$g$ = universal gravitational constant—in./sec.$^2$
$V_o$ = initial volume at start of stroke—in.$^3$
$M$ = mass of load being moved—#

Figure 5:
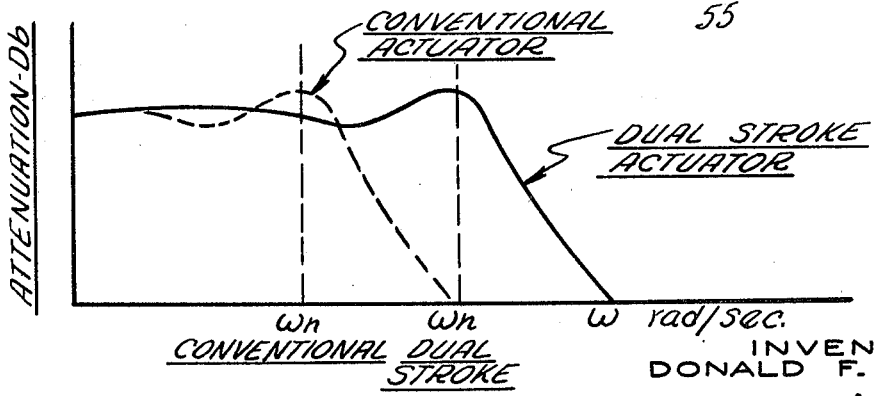
FIGURE 5 is a diagrammatic view of the comparative frequency response curves of a conventional actuator and the dual stroke actuator ofthe present invention.

It can be seen from Equation 17 that for any given actuator, the values of $P_s$, $A$, $g$ and $M$ are constant; thus, the only variable is $V_o$. Since, for the example used in this comprehensive analysis, the $V_o$ for the dual stroke actuator is .2 of the $V_o$ for the conventional actuator, it can be seen that the dual stroke actuator will approximately double the natural frequency of an otherwise similar actuator system. The comparative effect of the increase in natural frequency of the dual stroke actuator system is shown in the frequency response curve of FIGURE 5, wherein the dotted curve shows the frequency response of a conventional actuator, and the solid curve shows the frequency response of a similar dual stroke actuator. The slight dip in both of these curves prior to the rise to the maximum magnitude (at $W_n$) indicates a typical third order characteristic curve which is representative of the frequency response curve of this type of control system.

OPERATION

The compressive fluid operated actuator control system shown in FIGURE 1 utilizes a conventional pressurized storage bottle 43 charged with a finite quantity of compressible fluid at a pressure substantially greater than the maximum anticipated system operating pressure. Pressurized fluid from said storage bottle 43 is conducted to start valve 44 by means of conduit 45 connected intermediate storage bottle 43 and start valve 44. Upon receipt of an appropriate start signal, via start signal conduit 65, start valve 44 permits the discharge of pressurized fluid into conduit 46 connected intermediate start valve 44 and pressure reducing valve 47, and thence into pressure reducing valve 47 where the magnitude of the supply pressure is reduced to the preselected maximum operating pressure. It will be observed that conduit 48 is provided to permit pressurized fluid to be conducted from pressure reducing valve 47 to entrance conduit 1 located in actuator housing 26. The regulated pressurized fluid enters conduit 1 and then proceeds directly to chamber 2 through conduit 17, and simultaneously proceeds directly to chamber 3 via conduit 18.

Amplifier 4 is supplied with a source of amplification power from an appropriate power supply, not shown, said power enters power amplifier unit 4 where an appropriate control input signal fed into power amplifier 4 from an appropriate control device, also not shown, is increased in power and thence conducted through signal conduit 5 to torque motor 6. The amplified power signal is impressed upon torque motor 6 such that armature 7 of torque motor 6 is bidirectionally rotatively positioned responsive to the polarity of said amplified input signal. Armature 7 and extension 66 rigidly secured to armature 7 are adjustably connected to threaded shaft 49 which is fixedly connected to wire 50 such that rotative motion of armature 7 bidirectionally axially positions control valve 8. Threaded shaft 49 allows setting of control valve 8 at mid-position with no current into the coils of torque motor 6. The wire 50 is flexible so as to minimize side loads on the valve 8 due to rotary motion of armature 7. The net effect of the axial movement of control valve 8, which will be explained in detail later in this description, is to axially move output piston 9 bidirectionally responsive to corresponding bidirectional movement of control valve 8 such that a rotational movement of control surface 10 results. The rotational movement of control surface 10 is accomplished through the translation of axial motion to rotary motion by means of the kinematics of journal pin 38 and elongated slot 40 of bell crank mechanism 11 cooperating with output piston 9 through connecting rod 39 fixedly secured to output piston 9 and rotative journal 38. The rotative motion of bell crank mechanism 11 is transmitted to control surface 10 through intermediate control surface rotative shaft 13 fixedly secured to both bell crank 11 and control surface 10. Control shaft 13 is journaled in bearings 63. Bearings 63 are contained in housing 64 such that control shaft 13 and housing 26 have a fixed spaced apart relation to each other. Rotary potentiometer 12 fixedly connected to rotative shaft 13 provides a negative position feedback signal of control surface 10 that is fed back to amplifier 4. A rate or velocity feedback device 14 has a movable armature 51 fixedly connected to threaded shaft 16 and circumscribed by housing 52. Threaded shaft 16 is in threaded engagement with an actuating arm 15 fixedly attached to output piston 9 such that the rate of axial movement of output piston 9 produces a corresponding rate of movement of armature 51. The rate of movement of armature 51 within the housing 52 of velocity transducer 14 produces a negative electrical output signal, whose magnitude varies in proportion to the rate of movement (velocity) of armature 51. The negative feedback signal produced by velocity transducer 14 is fed back to amplifier 4 by means of signal conduit 53. Similarly, the negative positioned feedback signal of rotary potentiometer 12 is fed back to amplifier 4 by means of signal conduit 54. The velocity feedback signal and positioned feedback signal are summed in amplifier 4 and the combined result is subtracted from the positive input control signal to produce a neutral or null condition for each positive input signal. Thus, the position and velocity feedback signals being negative feedback signals will oppose the positive input signal such that a null or center position will be reached, whereby further movement of the output piston 9 will cease.

The novel dual stroke compressive fluid operated actuator of the present invention with its novel variable displacement is one element of a group of elements that combine to comprise a complete compressible fluid actuated system for moving a control surface with position and velocity feedback.

In FIGURE 1 movement of output control valve 8 to the right from its center position in response to an input signal will cause land 55 of control valve 8 through intermediate connecting port 56 to expose the end opening of conduit 27 to the pressurized fluid of chamber 2. Pressurized fluid enters chamber 21 via conduit 27, and by the throttling action of land 55 the pressure in chamber 21 increases to the level necessary to produce a net force that will move output piston 9 axially to the left. Since the area 22 of output piston 9 is twice that of area 29 of output piston 9, the pressure in chamber 21 will produce a force unbalance sufficient to move output piston 9 to the left when the magnitude of the pressure in chamber 21 is greater than one-half the magnitude of the pressure in chamber 3. When the magnitude of the pressure in chamber 21 is precisely one-half the magnitude of the pressure in chamber 3, a force balance on actuator piston 9 will exist and there will be no resulting axially movement of actuator piston 9. This pressure condition represents the null condition. The null condition corresponds to the center position of control valve 8. This center position of control valve 8 represents that position in which the constant fluid pressure of chamber 2 is throttled across land 55 of valve 8 such that the pressure in conduit 27 and its connecting chamber 21 is one-half the supply pressure contained in chamber 3.

To produce motion of output piston 9 to the right, control valve 8 is moved to the left such that conduit 27 via land 55 is exposed to a reduced or atmospheric pressure through conduit 58 and atmospheric port 59. This movement of control valve 8 reduces the pressure in chamber 21 to a magnitude less than one-half the pressure in chamber 3, thus producing a net reactive force on the surfaces 22 and 29 of actuator piston 9 such that there is a net positive reactive force on output piston 9 tending to urge said piston the the right. The left end area of valve 8 is continuously connected to atmospheric or ambient pressure by interconnected passageways 28, 58 and atmospheric port 59. This continuous passageway permits the area of land 79 of valve 8 opposite the area of said land exposed to chamber 56 to be constantly vented to atmosphere, thus precluding the build-up or reduction from ambient of the pressure on the left end area of valve 8 during relative movement of piston 24 and valve 8.

Suitable seals, such as the O ring seals shown in FIGURE 4, are provided throughout to prevent the passage of pressured fluid from one chamber to another.

Sleeve 73 is pressed into bore 74 of follow-up piston 24 such that a fixed fluid tight relationship is established between the outer periphery of sleeve 73 and the periphery of bore 74. Follow-up valve 30 is a spool valve having a land 76 at one end and a land 60 at the opposite end. Valve 30 is constrained within bore 75 of sleeve 73 to form a chamber 77 between spaced apart lands 76 and 60. Said valve 30 moves axially in bore 74 in relation to sleeve 73. Pressurized fluid is conducted from chamber 61 to chamber 77 via interconnected passageways 33 and 34.

Rod 31 is fixedly connected to valve 30 with the longitudinal axis of rod 31 positioned coaxial the longitudinal axis of valve 30 such that passageway 33 comprises an annular cavity formed by the outer periphery of rod 31 and the inner periphery of the longitudinally disposed bore of valve 30. Rod 31 threadably engages piston 9. The threaded engagement of rod 31 into piston 9 permits adjustment of the axial displacement $L_{2a}$.

Follow-up valve 30 is fixedly secured in a spaced apart relationship to actuator piston 9 by means of rod 31 positioned intermediate output piston 9 and follow-up valve 30, and fixedly secured to both said piston and said valve so as to cause said valve 30 to move to the right in concert with actuator piston 9. At a preselected distance shown in FIGURE 4 as $L_{2a}$, land 60 of valve 30 fixedly connected to actuator piston 9 in a spaced apart relationship by rod 31 will uncover the end opening of conduit 32 in follower piston 24. Once land 60 exposes conduit 32 to fluid pressure, maximum fluid pressure $P_{sm}$ will enter chamber 35 via conduit 19, chamber 61, conduit 33, conduit 34 and conduit 32, all interconnected with one another to provide one continuous fluid passageway. The introduction of high pressure fluid into chamber 35 will expose surface 72 to maximum regulated fluid pressure. The area of surface 72 is greater than the area of surface 25. Since both of these surfaces will be simultaneously exposed to the same pressure, a net force will result that will move follower piston 24 to the right in concert with output piston 9. Output piston 9 and follower piston 24 will move in unison to the right a distance $L_{2b}$, as shown in FIGURE 4, such that the total half stroke distance to the right $L_{2a}+L_{2b}$ is equal to $L_1$, thereby providing an equal maximum actuator stroke either side of the mid-stroke position.

To illustrate the conditions that may be encountered in such a dual stroke actuator as herein contemplated, the supply bottle 43 may be pressurized to 7,000 p.s.i. The maximum regulated fluid pressure downstream of pressure regulating value 47 may be 1,000 p.s.i. The total half stroke L, or $L_{2a}+L_{2b}$ may be .500 inch. The distance $L_{2a}$ may be .100 inch. The natural frequency of a representative compressive fluid actuated control surface system may be 40 c.p.s., and the total operational time of a typical flight regime may be 40 seconds.

Although one embodiment of this invention has been illustrated and described herein, it will be apparent that various changes may be made in the construction and arrangement of the various elements and parts without departing from the scope of this novel concept.

What I claim is:

1. An actuator comprising; a source of compressible motive fluid, a housing, movable wall means forming a first and a second chamber in said housing, force output means forming a third chamber in said housing, a fourth chamber intermediate said force output means and said movable wall means, control means adapted to vary the flow and pressure of said motive fluid to said fourth chamber to effect limited to and fro movement of said force output means, said movable wall means rigidly fixed to said housing during said limited to and fro movement of said force output means, follow-up means secured to said force output means, said follow-up means adapted to be in fluid communication with said movable wall means and so constructed and arranged as to maintain a spaced apart relationship between said force output means and said movable wall means responsive to movement of said force output means in one direction greater than said limited to and fro displacement.

2. In combination; a housing, a source of compressible operating fluid under pressure, a first and a second piston axially movable in said housing, a chamber intermediate said two pistons, control means adapted to direct said pressurized fluid to said chamber so that said first pistons responsive to said control means moves to and fro about a mid-stroke position within a preselected first portion of the total displacement of said first piston, said second piston rigidly fixedly positioned against said housing during said first portion displacement, follow-up means fixed to said first piston and so constructed and arranged as to maintain the volume of said chamber substantially constant responsive to movement of said first piston in one direction in excess of within a preselected first portion of the total displacement of said first piston.

3. A bidirectional output actuator including a source of compressible fluid under pressure, a housing, an actuator piston and a movable wall positioned in said housing so as to define a chamber therebetween, control means adapted to receive fluid from said source, and constructed and arranged to apply said fluid to said chamber to provide bidirectional movement of said actuator piston about a mid-displacement position, said movable wall rigidly secured to said housing during said bidirectional movement, follow-up means secured to said actuator piston and cooperating with said actuator piston and said movable wall to control said pressurized fluid during a preselected unidirectional displacement of said actuator piston greater than said bidirectional displacement so that said movable wall is displaced in relation to said actuator piston such that the volume of said chamber remains substantially constant throughout said unidirectional displacement in excess of said bidirectional displacement.

4. A power actuation device comprising; a source of compressible fluid under pressure, a casing, a pair of pistons disposed in said casing so that said casing and said pistons define a chamber intermediate said pistons, fluid passageways fluidly connecting a control valve to said chamber and to said casing so that pressurized fluid responsive to movement of said control valve produces a preselected limited bidirectional movement of one of said pistons, said other piston rigidly secured to said casing during said limited bidirectional movement of said one piston, follow-up means adapted to move in unison with said one piston and so constructed and arranged that the volume of said chamber is maintained substantially constant for movement of said one piston in one direction in excess of said preselected limited movement.

5. A bidirectional actuator including a source of compressible fluid under pressure, a casing, movable wall means and force output means positioned in said casing and adapted to define a chamber intermediate said output means and said wall means, control means adapted to receive said pressurized fluid and vary the magnitude of said pressurized fluid supplied to said chamber so as to simultaneously apply pressurized fluid to said output means and said wall means to produce a bidirectional axial displacement for a first portion of the total displacement of said output means, said wall means rigidly maintained in a fixed relation to said casing during said bidirectional axial displacement of said output means, follow-up means constructed and arranged to direct pressurized fluid to said movable wall so that said movable wall and said output means move in unison in one direction for a preselected end portion of the total displacement of said output means.

6. In combination; a source of compressible fluid under pressure, a casing, bidirectional movable actuator means positioned in said casing, bidirectional movable wall means positioned in said casing so as to form a chamber intermediate said actuator means and said wall means, first control means fluidly connected to said chamber, and said source of compressible fluid such that said actuator means is bidirectionally axially positioned with respect to said wall means a first portion of the total stroke responsive to corresponding bidirectional axial displacement of said first control means, said wall means rigidly positioned against said casing during said first portion of the total stroke of said actuator means, second control means secured to said actuator means and fluidly connected to said movable wall means so that said actuator means and said movable wall means translate in unison for an end portion of the total displacement of said actuator means in one direction from the actuator mid-stroke position.

7. A device, as claimed in claim 6, wherein said second control means comprises; a follow-up valve fixedly connected to said actuator means and in fluid communication with said energy source, said follow-up valve being positioned in said movable wall and so constructed and arranged that displacement of said actuator in one direction in excess of a preselected first portion of the total displacement from the mid-stroke position thereby causes simultaneous bidirectional movement of said actuator means and said movable wall means for the total range of said excess displacement from the mid-stroke position.

8. A bidirectional actuator including a casing having a plurality of ports, a source of compressible pressurized fluid, a movable wall positioned to divide said casing into a first and a second chamber, an actuator piston positioned to define a third chamber in said casing, and a fourth chamber intermediate said movable wall and said piston, control means communicating a variable fluid pressure to said fourth chamber responsive to a variable displacement of said control means to move said actuator piston to and fro about a mid-stroke position of said actuator piston, pressurized fluid directly communicated to said first chamber and said third chamber through the ports of said casing, follow-up means directly connected to said actuator piston, pressurized fluid communicated to said second chamber responsive to movement of said follow-up means so that said actuator piston and said movable wall are bidirectionally displaced in unison for a preselected extended portion of the movement of said actuator piston in one direction from the mid-stroke position.

References Cited

UNITED STATES PATENTS

| | | | |
|---|---|---|---|
| 2,884,905 | 5/1959 | Jensen | 91—376 |
| 3,113,489 | 12/1963 | Cruse et al. | 91—376 |
| 3,199,298 | 8/1965 | Brown | 91—376 |

PAUL E. MASLOUSKY, *Primary Examiner.*